June 24, 1930.   P. A. BORDEN ET AL   1,765,563
MEANS FOR MEASURING ELECTRICAL QUANTITIES
Filed Feb. 17, 1925    2 Sheets-Sheet 1

Inventors.
Perry A. Borden
Harry S. Baker
Louis A. Paine
by H. J. S. Dennison
atty.

Inventors.
Perry A. Borden.
Harry S. Baker.
Louis A. Paine.
by H. J. S. Dennison
atty.

Patented June 24, 1930

1,765,563

UNITED STATES PATENT OFFICE

PERRY A. BORDEN, OF TORONTO, ONTARIO, HARRY S. BAKER, OF NIAGARA FALLS, ONTARIO, AND LOUIS A. PAINE, OF TORONTO, ONTARIO, CANADA, ASSIGNORS TO THE LINCOLN METER COMPANY, LIMITED, OF TORONTO, CANADA

MEANS FOR MEASURING ELECTRICAL QUANTITIES

Application filed February 17, 1925. Serial No. 9,879.

The principal object of the invention is to devise a simple and reliable means for effecting a very accurate measurement of the electrical quantities flowing in a circuit, which will not be affected by external temperature conditions.

A further object is to provide a device which will produce a thermal E. M. F. proportional to the load, the relation between which is linear or quadratic.

The principal feature of the invention consists in translating electrical quantities into proportional direct electromotive force through the medium of a thermo-electric converter in which varying external temperature conditions are equalized in the structure before they affect the thermal electro-motive force produced therein and in which the mass of the structure is of high thermal conductivity and tends to equalize the generated temperatures affecting the thermo-couple on a predetermined time basis.

In the accompanying drawings, Figure 1 is a diagram showing the method of measuring alternating current electrical quantities with our improved device.

In carrying this invention into effect certain well known principles are utilized and particularly the translating features of a thermo-couple. When an electric circuit is formed of two dissimilar metals and one junction point between sections of these metals is maintained at a temperature differing from another junction point there is developed a difference of electrical potential, known as thermo-electromotive force.

The electromotive force thus developed is substantially proportional to the temperature difference between the junction points in accordance with the constant of the metals of the couple. It will of course be understood that a number of thermo-couples may be joined in series to increase the electromotive force.

Figure 1:
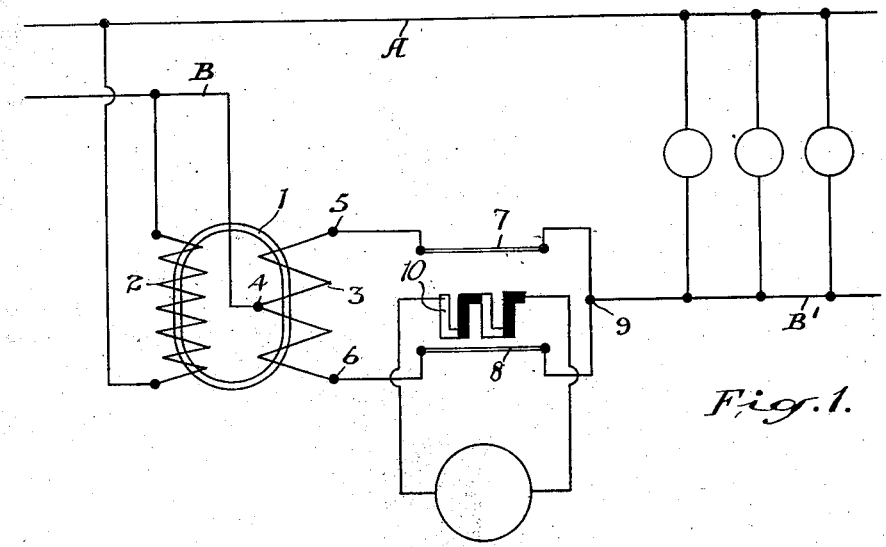

In the diagrammatic illustration of the application of this invention shown in Figure 1, a transformer 1 is provided with a winding 2 energized from the voltage of the system A. B. under measurement.

A secondary winding 3 is connected at its midpoint 4 to the line B and the end terminals 5 and 6 are connected respectively to the resistors or heaters 7 and 8 and these are jointed at their resistance midpoint 9 to the load line B'.

It will be understood that the line current of the system under measurement enters the secondary coil at 4 and leaves at 9. In the event of there being no current flowing in the system but with 2 energized by the voltage of the system, a voltage is induced in the coil 3. This voltage causes a current to circulate through 3 and the heaters 7 and 8 and heat is generated therein. The effect produced is fully described in the United States Patent 1,156,412 October 12, 1915, of Paul M. Lincoln.

A differential means in the form of a thermo-couple 10 or a plurality of thermo-couples is arranged between the heaters 7 and 8 and is adapted to measure the difference in the temperatures of said heaters. This differential means is affected by the relative temperatures of the heaters 7 and 8 and will give an effect in proportion to the applied quantity or quantities.

Figure 2:
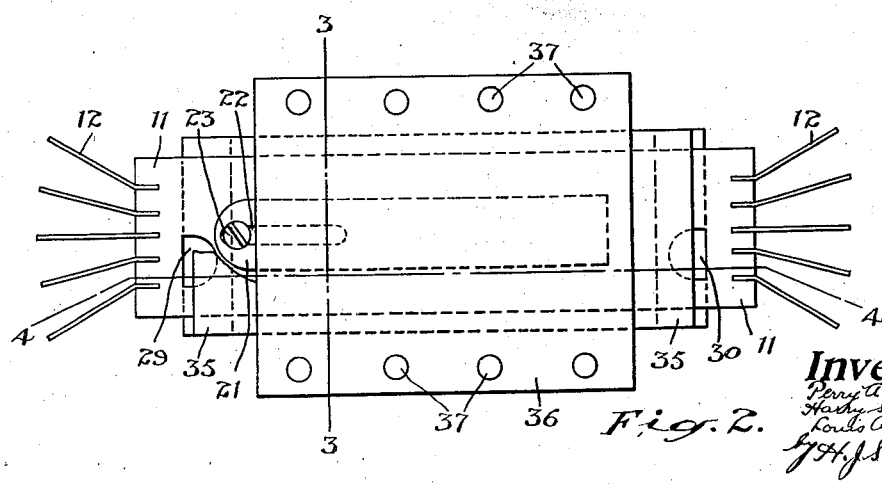
Figure 2 is an enlarged plan view of the preferred form of thermo-electric converter.
Figure 3:
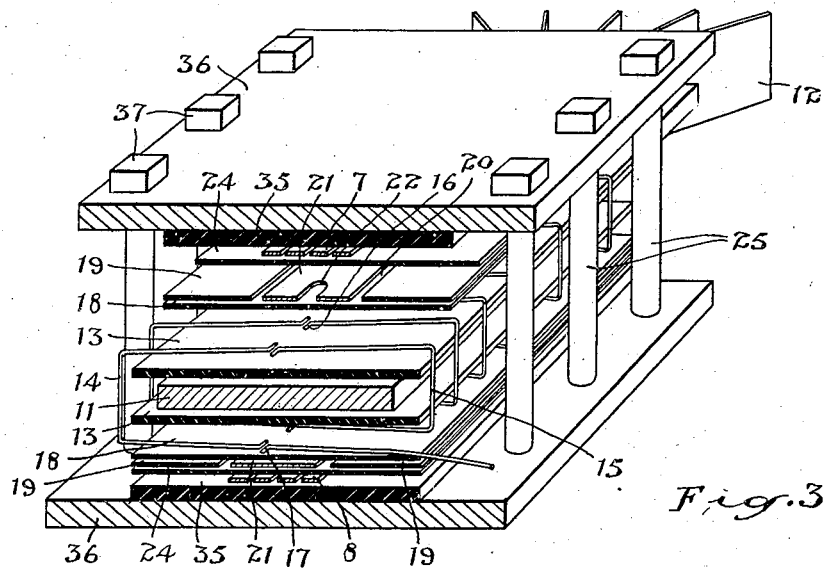
Figure 3 is an enlarged perspective section taken on the line 3—3 of Figure 2.
Figure 4:
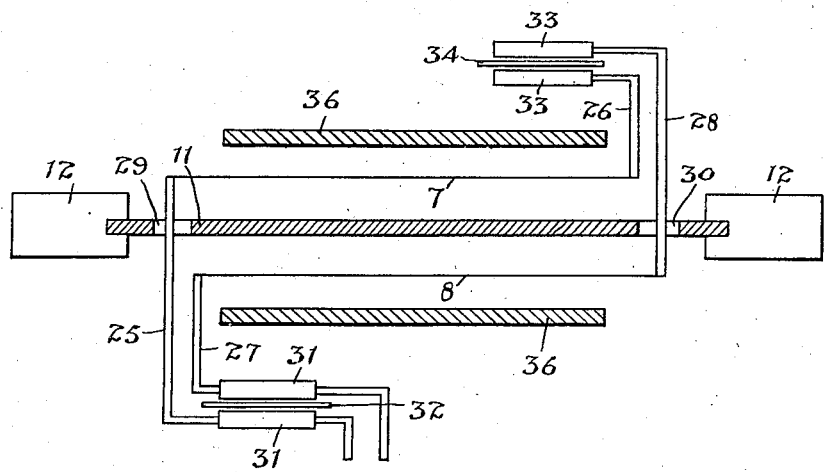
Figure 4 is an enlarged longitudinal section through the line 4—4 of Figure 2.

The differential means 10 diagrammatically illustrated in Figure 1 is preferably constructed in the form of a thermal-converter as illustrated in Figures 2, 3 and 4.

The converter here shown is constructed of a metal plate 11 of rectangular form which may be provided with a plurality of heat radiating fins 12 arranged at each end. On both sides of the plate 11 are placed the layers 13 of insulating material which overlap the longitudinal edges of said plate.

A metallic strip, formed of a plurality of short lengths 14 and 15 of dissimilar metals electrically connected alternately at their ends is wound in helical arrangement around the insulation enclosed plate 11 so that the lengths 14 lap around one longitudinal edge of the plate and the lengths 15 lap around the opposite edge.

This construction forms a series of thermo-couples and the junction ends 16 and 17 are arranged centrally above and below the longitudinal centre line of the insulated plate 11

Thin layers 18 of insulating material are arranged to cover the portions of the thermo-couples overlying the insulation 13 covering the plate 11. Insulating strips 19 are placed on the outward sides of the insulation layers 18, being spaced apart to form the central longitudinal spaces 20 in which are arranged thin strips 21 of heat conducting material which are adapted to slide longitudinally in said spaces..

The strips 21 extend the full length of the insulating layers and project at one end beyond the same and each projecting end is provided with a longitudinal slot 22 through which is inserted a screw 23 secured in the plate 11, said screws forming the means for holding the strips 21 in adjusted positions and also conducting heat from the strips to the plate 11.

Thin plates 24 of insulating material are placed outside of the strips 19 enclosing the strips 21 and outside of these plates and arranged longitudinally over the strips 21 are the thin flat strips of resistance metal which form the heaters 7 and 8. The terminal ends of the strips 7 are secured to the terminals 25 and 26 respectively, while the terminal ends of the strips 8 are secured to the terminals 27 and 28 respectively the terminals 25 and 28 extend through holes 29 and 30 in the plate 11.

The terminals 25 and 27 have connected to their outer ends massive equalizing plates 31 which are separated by a suitable insulating plate 32 and the terminals 26 and 28 are connected to similar equalizing plates 33 spaced by the insulating plate 34.

The purpose of the equalizing plates is to allow a free heat flow between the respective electrical conductors thus preventing external local temperature differences from causing false temperature differences in the heaters.

The arrangement of the adjustable metal strips 21 permits their being moved longitudinally to regulate the amount of metal lying between the junctions of the thermo couples and the adjacent heaters, thus regulating the diversion of heat that would otherwise have reached the thermo junctions and thus forming a very convenient method of calibration.

Heavy insulating plates 35 are arranged outside of the heaters 7 and 8 and the whole structure is clamped tightly together by a pair of heavy metal plates 36 which are secured by the bolts 37, said bolts assisting materially in equalizing the temperature of the plates.

In a thermal-converter constructed as described the relative temperatures of the junctions on either side of the plate 11 depends upon the relative temperatures of the heaters 7 and 8 and the conduction of heat through the insulating and conducting media between the couples and the heaters, and as the mass is rigidly clamped together there will be practically no error due to convection and the heat will be dissipated through the agency of the central plate 11 and the clamping plates 36.

It is desirable to select the metals used in the heaters and thermo-couples so that there will be a uniform linear relation, within certain temperature limits, between the applied electrical quantity and the derived electromotive force.

The structure illustrated in the drawing and described in the preceding specification shows only a single phase application. It is obvious that a plurality of resistances which shall correctly measure polyphase loads may be introduced in lieu of the heaters 7 and 8. It will also be understood that a single heater 7 or 8 may be used if it is desired to secure a response to amperes only.

What we claim as our invention is:

1. A thermal battery comprising a thermal conductor, a plurality of thermo-couples electrically connected and encircling said conductor and being electrically insulated therefrom, electric heating means arranged adjacent to the junction ends of said thermo-couples, insulating means arranged on the outward side of said heating means, and means for clamping said members in a compact unit with the heating means and thermo-couples in intimate thermal relation.

2. A thermal battery comprising a thermal conductor, a plurality of thermo-couples electrically connected and encircling said conductor and being electrically insulated therefrom, electric heaters arranged on opposite sides of said thermo-couples, thermal and electric insulating means arranged at the outward side of each of said heaters, and means for clamping said heaters into close association with said thermo-couples and said thermo-couples to said conductor.

3. A thermal battery comprising a plate of heat conducting material, a plurality of thermo-couples electrically connected and extending around said heat conducting plate and being electrically insulated therefrom, electrical heaters arranged on opposite sides of said heat conducting plate and electrically insulated from said thermo-couples, insulating means arranged on the outward side of said electrical heaters, and means for clamping said elements into a compact unit.

4. A thermal battery comprising a plate of heat conducting material, a plurality of thermo-couples electrically connected and extending around said heat conducting plate and being electrically insulated therefrom, electrical heaters arranged on opposite sides of said heat conducting plate and electrically insulated from said thermo-couples, heavy insulating members arranged at the outward sides of said electrical heaters, plates of heat-conducting material arranged on the outward side of said insulating plates, and heat conducting means connecting said latter heat conducting plates and clamping the same together to form a compact unit.

PERRY A. BORDEN.
LOUIS A. PAINE.
HENRY S. BAKER.